(12) United States Patent
Igarashi et al.

(10) Patent No.: US 12,460,102 B2
(45) Date of Patent: Nov. 4, 2025

(54) PAINT-PROTECTIVE COATING MATERIAL AND ACRYLIC COATING COMPOSITION

(71) Applicant: NITTO DENKO CORPORATION, Ibaraki (JP)

(72) Inventors: Takeshi Igarashi, Ibaraki (JP); Eiichi Imoto, Ibaraki (JP); Chihiro Yoshida, Ibaraki (JP); Koki Hashimoto, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 662 days.

(21) Appl. No.: 17/745,173

(22) Filed: May 16, 2022

(65) Prior Publication Data

US 2022/0363940 A1 Nov. 17, 2022

(30) Foreign Application Priority Data

May 17, 2021 (JP) .................. 2021-082914
Feb. 18, 2022 (JP) .................. 2022-024082

(51) Int. Cl.
*C09D 5/20* (2006.01)
*C09D 7/61* (2018.01)
*C09D 133/20* (2006.01)

(52) U.S. Cl.
CPC .............. *C09D 133/20* (2013.01); *C09D 5/20* (2013.01); *C09D 7/61* (2018.01)

(58) Field of Classification Search
CPC .......... C09D 133/20; C09D 5/20; C09D 7/61; C09D 5/028; C09D 133/08; C08F 220/44; C08F 2800/10; C08F 220/1804; C08F 2800/20; C08K 2003/2241; C08K 2003/265
USPC .......................................................... 524/1
See application file for complete search history.

(56) References Cited

U.S. PATENT DOCUMENTS

| | | | |
|---|---|---|---|
| 2003/0045627 A1* | 3/2003 | Rosano | C09C 1/3669 524/547 |
| 2005/0123704 A1 | 6/2005 | Sakai et al. | |
| 2007/0036953 A1 | 2/2007 | Nonaka et al. | |
| 2010/0116432 A1 | 5/2010 | Uesugi | |
| 2011/0126983 A1 | 6/2011 | Suzuki et al. | |
| 2018/0072912 A1* | 3/2018 | Junk | C08F 220/1808 |
| 2024/0263033 A1* | 8/2024 | Igarashi | C09D 133/062 |
| 2024/0392051 A1* | 11/2024 | Igarashi | C09D 5/022 |

FOREIGN PATENT DOCUMENTS

| | | |
|---|---|---|
| CN | 1912042 A | 2/2007 |
| CN | 101381585 A | 3/2009 |
| CN | 101679806 A | 3/2010 |
| GB | 1327030 A | 8/1973 |
| JP | 60-96671 A | 5/1985 |
| JP | 60-144369 A | 7/1985 |
| JP | 06-073261 A | 3/1994 |
| JP | 7-126572 A | 5/1995 |
| JP | 2004-224874 A | 8/2004 |
| JP | 2008-274153 A | 11/2008 |
| JP | 2010-126666 A | 6/2010 |
| JP | 2011-111552 A | 6/2011 |
| JP | 2016-008298 A | 1/2016 |
| WO | 2008/148763 A1 | 12/2008 |

OTHER PUBLICATIONS

Extended European Search Report dated Oct. 21, 2022 in European Application No. 22172998.1.
Suresh et al, "Effect of Copolymer Composition on the Dynamic Mechanical and Thermal Behaviour of Butyl Acrylate-Acrylonitrile Copolymers'", Macromolecular Materials and Engineering, 2003, vol. No. 288, No. 12, p. 980-988 (8 pages).
International Search Report for PCT/JP2022/020202 dated Jul. 19, 2022.
International Search Report for PCT/JP2022/020201 dated Jul. 19, 2022.
Notice of Allowance dated May 21, 2025, which issued during the prosecution of U.S. Appl. No. 18/561,059.
First Office Action issued Jul. 24, 2025 in Chinese Patent Application No. 202210538382.8.

\* cited by examiner

*Primary Examiner* — Hannah J Pak
(74) *Attorney, Agent, or Firm* — Sughrue Mion, PLLC

(57) ABSTRACT

Provided is a paint-protective coating material formed from an acrylic coating composition comprising an acrylic polymer as base polymer. The acrylic polymer-forming monomers includes a monomer ($m_T$) having a homopolymer Tg of 90° C. or higher and a monomer ($m_L$) having a homopolymer Tg of −30° C. or lower. The monomer ($m_T$) includes at least acrylonitrile. In the monomers, the monomers ($m_T$) and ($m_L$) have a molar ratio ($m_T/m_L$) of 0.8 or higher and 1.5 or lower. The paint-protective coating material has storage moduli of 150 MPa or higher and 1000 MPa or lower at 23° C., and 0.40 MPa or higher at 70° C.

9 Claims, 1 Drawing Sheet

PAINT-PROTECTIVE COATING MATERIAL AND ACRYLIC COATING COMPOSITION

CROSS-REFERENCE

The present application claims priority to Japanese Patent Application No. 2021-082914 filed on May 17, 2021 and Japanese Patent Application No. 2022-024082 filed on Feb. 18, 2022; the entire contents thereof are incorporated herein by reference.

BACKGROUND OF THE INVENTION

1. Field of the Invention

The present invention relates to a paint-protective coating material and an acrylic coating composition.

2. Description of the Related Art

For purposes such as prevention of surface damage in transporting, storing, aging and constructing articles having paint layers (or painted articles, e.g., painted automobiles and their components, or metal plates such as painted steel plates and molded articles therefrom), techniques are known such as adhering protective sheets to the paint layers for protection. A paint-protective sheet used for such purposes is generally constructed as an adhesively single-faced substrate-supported pressure-sensitive adhesive (PSA) sheet having a PSA layer on one face of a substrate sheet (support substrate) so that it can provide protection when adhered via the PSA to an adherend (an object to be protected). After the protective role is completed, the paint-protective sheet is removed (peeled away) from the adherend. Technical literatures related to paint-protective sheets include Japanese Patent Application Publication No. 2011-111552.

SUMMARY OF THE INVENTION

When protecting non-flat objects (especially objects having complex three-dimensional shapes such as automobile body shells), it is difficult to increase efficiency in suitable application of paint-protective sheets to the objects. In case of improper application of a paint-protective sheet to an object to be protected, for instance, when the applied paint-protective sheet has wrinkles, the wind may blow into the wrinkles while the post-application object is being stored or transported, thereby peeling off the paint-protective sheet and compromising the intended protection purpose.

On the other hand, it has been suggested to form a protective coat by directly applying a liquid protective coating composition onto the paint layer of an object to be protected and drying the liquid composition on the paint layer. Literatures related to this type of art include Japanese Patent Application Publication No. 2004-224874. However, unlike the aforementioned paint-protective sheet, the protective coat thus formed from a liquid composition is free of a substrate; thus, for removal from the paint layer after serving the protective role, it tends to lack sufficient removability and workability.

An objective of this invention is thus to provide a paint-protective coating material that is formed from a liquid coating composition and comes with good removability and workability in removal from a paint layer. Another related objective is to provide a coating composition suited for forming the paint-protective coating material and a method for forming the paint-protective coating material.

This Description provides a paint-protective coating material (or abbreviated to a "coating material" hereinafter) formed from an acrylic coating composition comprising an acrylic polymer as base polymer. The acrylic polymer-forming monomers include a monomer ($m_T$) having a homopolymer glass transition temperature (Tg) of 90° C. or higher and a monomer ($m_L$) having a homopolymer Tg of −30° C. or lower. The monomer ($m_T$) includes at least acrylonitrile. In the monomers, the monomer ($m_T$) and the monomer ($m_L$) have a molar ratio ($m_T/m_L$) of 0.8 or higher and 1.5 or lower. The coating material has a storage modulus at 23° C. (or "G'(23)" hereinafter) of 150 MPa or higher and 1000 MPa or lower, and has a storage modulus at 70° C. (or "G'(70)" hereinafter) of 0.40 MPa or higher. Such a paint-protective coating material can bring about good removability from paint layers and good removal workability for removal efficiency.

This Description provides an acrylic coating composition for forming a paint-protective coating material (or abbreviated to a "coating composition" hereinafter) that forms a paint-protective coating material having a storage modulus at 23° C. of 150 MPa or higher and 1000 MPa or lower and also having a storage modulus at 70° C. of 0.40 MPa or higher. The coating composition comprises an acrylic polymer as base polymer. The acrylic polymer-forming monomers include a monomer ($m_T$) having a homopolymer Tg of 90° C. or higher and a monomer ($m_L$) having a homopolymer Tg of −30° C. or lower. Here, the monomer ($m_T$) includes at least acrylonitrile. In the monomers, the monomer ($m_T$) and the monomer ($m_L$) have a molar ratio ($m_T/m_L$) of 0.8 or higher and 1.5 or lower. Such a coating composition can form a paint-protective coating material that shows good removability from paint layers and good removal workability.

In some embodiments of the art disclosed herein (including the paint-protective coating material, acrylic coating composition, paint protection method and so on disclosed herein; the same applies, hereinafter), the acrylic polymer preferably has a glass transition temperature calculated based on the monomer composition (or a "calculated Tg" hereinafter) of −30° C. or higher and −5° C. or lower. According to the acrylic polymer having a calculated Tg in the range, the resulting paint-protective coating material is likely to satisfy the G'(23) and G'(70) described above.

In some preferable embodiments, the acrylonitrile content of the monomers is above 50% by mole (mol %). This can bring about a paint-protective coating material that combines good removability from paint layers and good removal workability at a higher level with good balance.

In some embodiments of the art disclosed herein, the coating composition may further comprise 1 part to 60 parts by weight of an inorganic powder to 100 parts by weight of the acrylic polymer. According to a paint-protective coating material formed from a coating composition having such a composition, with the inorganic powder blocking light such as UV rays, photodegradation can be inhibited in the paint-protective coating material itself as well as in the paint layer protected with the paint-protective coating material. The inorganic powder preferably comprises titanium dioxide.

The coating composition can be in aqueous emulsion form where the acrylic polymer is dispersed in an aqueous solvent. Such an aqueous emulsion-based coating composition is preferable from the standpoint of environmental hygiene, etc. For instance, it is suited for reducing amounts of organic solvents used and emitted.

This Description provides a paint protection method comprising preparing a coating composition that comprises an acrylic polymer as base polymer, applying the coating composition to a paint layer of an object to be protected, and drying the coating composition to form a paint-protective coating material that temporarily protects the paint layer. The acrylic polymer-forming monomers include a monomer ($m_T$) having a homopolymer Tg of 90° C. or higher and a monomer ($m_L$) having a homopolymer Tg of −30° C. or lower. Here, the monomer ($m_T$) includes at least acrylonitrile. In the monomers, the monomer ($m_T$) and the monomer ($m_L$) have a molar ratio ($m_T/m_L$) of 0.8 or higher and 1.5 or lower. According to the paint protection method, the paint layer can be suitably protected with the paint-protective coating material. The paint-protective coating material can bring about good removability from paint layers and good removal workability.

In some preferable embodiments, the coating composition is applied with a slot die. By drying the slot-die coated coating composition, a paint-protective coating material can be efficiently formed on the paint layer.

In some embodiments of the art disclosed herein, the coating composition preferably has a viscosity $V_1$ of 20 Pa·s or higher and 200 Pa·s or lower, determined at 2 rpm using a BH viscometer. The coating composition preferably has a viscosity $V_2$ of 1.0 Pa·s or higher at a shear rate of 100 $\text{sec}^{-1}$, determined using a cone plate rheometer. The coating composition showing such viscometric properties has applicability suited for slot-die coating. Accordingly, it can be preferably used in an embodiment where it is slot-die coated onto a paint layer of an object to be protected; and by drying the composition, a paint-protective coating material can be efficiently formed on the paint layer.

The scope of invention for which patent protection is being sought by this application includes suitable combinations of the respective elements described in this Description.

DETAILED DESCRIPTION OF THE INVENTION

Figure 1:
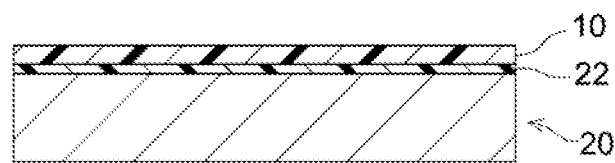
FIG. 1 shows a cross-sectional diagram schematically illustrating an example of the object protected with the paint-protective coating material according to this invention.

Preferable embodiments of the present invention are described below. Matters necessary to practice this invention other than those specifically referred to in this Description can be understood by a person skilled in the art based on the disclosure about implementing the invention in this Description and common technical knowledge at the time the application was filed. The present invention can be practiced based on the contents disclosed in this Description and common technical knowledge in the subject field.

In the following drawings, components or units having the same functions may be described with the same symbols allocated and the redundant description may be omitted or simplified. The embodiments illustrated in the drawings are schematic in order to clearly describe the present invention and the drawings do not accurately represent the size or scale of products actually provided.

As used herein, the term "acrylic polymer" refers to a polymerization product of monomers that include at least one species of monomer selected from the group consisting of a monomer having at least one (meth)acryloyl group per molecule and (meth)acrylonitrile. Hereinafter, the monomer having at least one (meth)acryloyl group per molecule and (meth)acrylonitrile are comprehensively referred to as "acrylic monomers" as well. Accordingly, as used herein, an acrylic polymer is defined as a polymer comprising a monomeric unit derived from an acrylic monomer. Typical examples of the acrylic polymer include a polymer whose acrylic monomer content accounts for more than 50% by weight (preferably more than 70% by weight, e.g., more than 90% by weight) of the acrylic polymer-forming monomers.

As used herein, the term "(meth)acryloyl" comprehensively refers to acryloyl and methacryloyl. Similarly, the terms "(meth)acrylate," "(meth)acryl" and "(meth)acrylonitrile" comprehensively refer to acrylate and methacrylate, acryloyl and methacryloyl, and acrylonitrile and methacrylonitrile, respectively.

<Acrylic Polymer>

The acrylic coating composition in the art disclosed herein comprises an acrylic polymer as base polymer. Here, the term "base polymer" refers to a component accounting for more than 50% by weight (typically 70% by weight or more, e.g., 90% by weight or more, possibly 95% by weight or more, or even 100% by weight) of the polymer in the acrylic coating composition. The base polymer in a paint-protective coating material also means the same.

The acrylic polymer-forming monomers include at least acrylonitrile. The inclusion of acrylonitrile in the monomers helps bring about a paint-protective coating material that combines well-balanced removability from paint layers and removal workability as well as an acrylic coating composition capable of forming the coating material. Besides acrylonitrile, other monomers possibly included in the monomers are not particularly limited and can be suitably selected to obtain a desirable paint-protective coating material.

A favorable example of the non-acrylonitrile monomers possibly included in the monomers is an alkyl (meth)acrylate. By selecting a species and an amount used, the alkyl (meth)acrylate may help adjust the storage modulus, tensile properties, the SP value described later, etc. For the alkyl (meth)acrylate, solely one species or a combination of two or more species can be used.

As the alkyl (meth)acrylate, for instance, a compound represented by the following formula (1) can be preferably used:

$$CH_2=C(R^1)COOR^2 \tag{1}$$

Here, $R^1$ in the formula (1) is a hydrogen atom or a methyl group. $R^2$ in the formula (1) is an acyclic alkyl group having 1 to 20 carbon atoms. Hereinafter, such a range of the number of carbon atoms may be indicated as "$C_{1-23}$." The acyclic alkyl group can be linear or branched.

Specific examples of the alkyl (meth)acrylate wherein $R^2$ is a $C_{1-20}$ acyclic alkyl group are not particularly limited. Examples include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate.

The acrylic polymer-forming monomers may include, as the non-acrylonitrile monomer, a non-alkyl-(meth)acrylate monomer (a monomer that is not an alkyl (meth)acrylate). Examples of such monomers include functional group-containing monomers such as carboxy group-containing monomers, hydroxy (OH) group-containing monomers, acid anhydride group-containing monomers, amide group-containing monomers, amino group-containing monomers, epoxy group-containing monomers, cyano group-containing monomers, keto group-containing monomers, monomers having nitrogen atom-containing rings (N-containing rings), alkoxysilyl group-containing monomers and imide group-containing monomers. Proper use of functional group-containing monomers can increase the cohesive strength of acrylic polymer. The functional group-containing monomers may also help adjust the storage modulus, tensile properties, the SP value described later, etc.

Examples of carboxy group-containing monomers include acrylic acid (AA), methacrylic acid (MAA), carboxyethyl (meth)acrylate, carboxypentyl (meth)acrylate, itaconic acid, maleic acid, fumaric acid, crotonic acid and isocrotonic acid. Among them, AA and MAA are preferable.

Examples of hydroxy group-containing monomers include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate; polypropylene glycol mono(meth)acrylate; and N-hydroxyethyl (meth)acrylamide. Particularly preferable hydroxy group-containing monomers include hydroxyalkyl (meth)acrylates having linear alkyl groups with two to four carbon atoms.

Examples of amide group-containing monomers include (meth)acrylamide, N,N-dimethyl (meth)acrylamide, N-butyl (meth)acrylamide, N-methylol (meth)acrylamide, N-methylolpropane (meth)acrylamide, N-methoxymethyl (meth)acrylamide and N-butoxymethyl (meth)acrylamide.

Examples of amino group-containing monomers include aminoethyl (meth)acrylate, N,N-dimethylaminoethyl (meth)acrylate and t-butylaminoethyl (meth)acrylate.

Examples of epoxy group-containing monomers include glycidyl (meth)acrylate, methylglycidyl (meth)acrylate and allyl glycidyl ether.

Examples of cyano group-containing monomers include methacrylonitrile and 2-cyanoethyl (meth)acrylate.

Examples of keto group-containing monomers include diacetone (meth)acrylamide, diacetone (meth)acrylate, vinyl methyl ketone, vinyl ethyl ketone, allyl acetoacetate and vinyl acetoacetate.

Examples of monomers having N-containing rings include N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam and N-(meth)acryloyl morpholine.

Examples of alkoxysilyl group-containing monomers include (3-(meth)acryloxypropyl)trimethoxysilane, (3-(meth)acryloxypropyl)triethoxysilane, (3-(meth)acryloxypropyl)methyldimethoxysilane and (3-(meth)acryloxypropyl)methyldiethoxysilane.

Examples of imide group-containing monomers include cyclohexylmaleimide and isopropylmaleimide.

For an increase in cohesive strength and like purpose, the acrylic polymer-forming monomers may include other comonomers besides the monomers described above. Examples of the other comonomers include vinyl ester-based monomers such as vinyl acetate, vinyl propionate and vinyl laurate; aromatic vinyl compounds such as styrene, substituted styrenes (α-methylstyrene, etc.) and vinyltoluene; cycloalkyl (meth)acrylates such as cyclohexyl (meth)acrylate, cyclopentyl (meth)acrylate and isobornyl (meth)acrylate; aromatic ring-containing (meth)acrylates such as aryl (meth)acrylates (e.g., phenyl (meth)acrylate), aryloxyalkyl (meth)acrylate (e.g., phenoxyethyl (meth)acrylate) and arylalkyl (meth)acrylate (e.g., benzyl (meth)acrylate); olefinic monomers such as ethylene, propylene, isoprene, butadiene and isobutylene; chlorine-containing monomers such as vinyl chloride and vinylidene chloride; isocyanate group-containing monomers such as 2-(meth)acryloyloxyethylisocyanate; alkoxy group-containing monomers such as methoxyethyl (meth)acrylate, ethoxyethyl (meth)acrylate and ethyl carbitol (meth)acrylate; vinyl ether-based monomers such as methyl vinyl ether and ethyl vinyl ether; and a polyfunctional monomer having two or more (e.g., three or more) polymerizable functional groups (e.g. (meth)acryloyl groups) per molecule, such as 1,6-hexanediol di(meth)acrylate and trimethylolpropane tri(meth)acrylate.

The acrylic polymer-forming monomers include a monomer ($m_T$) having a homopolymer Tg of 90° C. or higher and a monomer ($m_L$) having a homopolymer Tg of −30° C. or lower. Here, the monomer ($m_T$) includes at least acrylonitrile (homopolymer Tg: 97° C.). Accordingly, the acrylic polymer is a polymerization product of monomers that comprise the monomer ($m_L$) and monomer ($m_T$) comprising at least acrylonitrile and may further comprise other monomers. As for the homopolymer Tg values of the respective monomers, similar to the homopolymer glass transition temperatures used for determining the calculated Tg described later, values given in known documents are used. When no homopolymer Tg values are given in known documents, values obtained by the method according to Japanese Patent Application Publication No. 2007-51271 are used.

The monomer ($m_T$) may increase the acrylic polymer's calculated Tg and help enhance the cohesive strength and high-temperature properties (e.g. less lowering of storage modulus in a high temperature range, removability at high temperatures, etc.). As the monomer ($m_T$), acrylonitrile can be used alone or in combination with other monomer(s) having a homopolymer Tg of 90° C. or higher. For the other monomer(s) having a homopolymer Tg of 90° C. or higher, the corresponding species can be suitably selected among, for instance, the aforementioned various monomers while not limited to these. The other monomer(s) can be used with acrylonitrile, solely as one species or in a combination of two or more species. The maximum homopolymer Tg of each monomer used as the monomer ($m_T$) is not particularly limited. For instance, it can be 250° C. or lower, 200° C. or lower, or even 150° C. or lower.

Non-limiting specific examples of the non-acrylonitrile monomer possibly used as the monomer ($m_T$) include acrylic acid, methacrylic acid, methyl methacrylate, methacrylonitrile, acryloylmorpholine, acrylamide, isobornyl acrylate, isobornyl methacrylate, dicyclopentanyl acrylate, dicyclopentanyl methacrylate, adamantyl acrylate and tert-butyl methacrylate. Favorable examples include acrylic acid and methyl methacrylate.

The acrylonitrile content of monomer ($m_T$) can be, for instance, 35 mol % or higher. From the standpoint of readily obtaining favorable physical properties of the coating material, it is suitably 50 mol % or higher, or preferably 60 mol % or higher. In some embodiments, the acrylonitrile content of monomer ($m_T$) can be above 70 mol %, above 80 mol %, above 90 mol %, above 93 mol %, or even 100 mol %. In some embodiments, the acrylonitrile content of monomer ($m_T$) can be 85 mol % or lower, 75 mol % or lower, 70 mol % or lower, or even 65 mol % or lower.

The acrylonitrile content of all the acrylic polymer-forming monomers can be, for instance, 20 mol % or higher. From the standpoint of readily obtaining favorable physical properties of the coating material, it is suitably 25 mol % or higher (e.g., 28 mol % or higher), preferably 30 mol % or higher, possibly 35 mol % or higher, or even 40 mol % or higher. The art disclosed herein can be preferably implemented in an embodiment where the acrylonitrile content of all the acrylic polymer-forming monomers is above 50 mol %. From the standpoint of the flexibility of the paint-protective coating material, the acrylonitrile content is suitably 60 mol % or lower, or preferably below 60 mol %. In some embodiments, the acrylonitrile content can be 57 mol % or lower, or even 56 mol % or lower. The art disclosed herein can also be implemented in an embodiment where the acrylonitrile content is 53 mol % or lower, 50 mol % or lower, or even 40 mol % or lower.

The monomer ($m_L$) may lower the acrylic polymer's calculated Tg and help enhance the low-temperature properties (e.g., cracking resistance at low temperatures, breaking/tearing resistance during removal from paint layers at low temperatures, etc.) of the paint-protective coating material. As the monomer ($m_L$), a species having a homopolymer Tg of −30° C. or lower can be used. It can be selected among, but not limited to, for instance, the aforementioned various monomers. For the monomer ($m_L$), solely one species or a combination of two or more species can be used. Non-limiting specific examples of monomers usable as the monomer ($m_L$) include n-butyl acrylate (BA), 2-ethylhexyl acrylate (2EHA), isooctyl acrylate, isononyl acrylate, isoamyl acrylate, 4-hydroxybutyl acrylate (4HBA), methoxyethyl acrylate, ethyl carbitol acrylate and ethoxy diethyleneglycol acrylate.

The minimum homopolymer Tg of each monomer used as the monomer ($m_L$) is not particularly limited. It can be, for instance, −100° C. or higher, −90° C. or higher, or −80° C. or higher. In some embodiments, as the monomer ($m_L$), a monomer having a homopolymer Tg in the range of −60° C. or higher and −40° C. or lower can be preferably used. Of the monomer ($m_L$), the ratio of monomer whose homopolymer Tg is in the range of −60° C. or higher and −40° C. or lower can be, for instance, 50 mol % or higher, 75 mol % or higher, 85 mol % or higher, 95 mol % or higher, or even 100 mol %.

In the monomers, the molar ratio ($m_T/m_L$) between the monomer ($m_T$) and the monomer ($m_L$) is suitably 0.8 or higher and 1.5 or lower. With the acrylic polymer formed from monomers having such a composition, the resulting paint-protective coating material is likely to satisfy the aforementioned G'(23) and G'(70). In some embodiments, the ratio $m_T/m_L$ is preferably below 1.5, more preferably 1.4 or lower, possibly 1.35 or lower, 1.30 or lower, or even 1.25 or lower. In some embodiments, the ratio $m_T/m_L$ is preferably 1.0 or higher, or more preferably above 1.0. This can bring about a paint-protective coating material that combines good removability from paint layers and good removal workability at a higher level with good balance. The ratio $m_T/m_L$ can also be 1.1 or higher, 1.15 or higher, or even 1.20 or higher.

The acrylic polymer-forming monomers may further include other monomer(s) besides the monomers ($m_T$) and ($m_L$), that is, a monomer having a homopolymer glass transition temperature of higher than −30° C. and lower than 90° C. (or a monomer ($m_J$) hereinafter). As the monomer (m), a species having a homopolymer glass transition temperature in the range can be selected among for instance, the aforementioned various monomers while it is not limited to these. For the monomer ($m_J$), solely one species or a combination of two or more species can be used. Non-limiting specific examples of monomers usable as the monomer ($m_J$) include ethyl acrylate (EA), ethyl methacrylate, methyl acrylate (MA), n-butyl methacrylate, isobutyl methacrylate, 2-hydroxyethyl acrylate, 2-hydroxyethyl methacrylate, 2-hydroxypropyl acrylate, 2-hydroxypropyl methacrylate, cyclohexyl acrylate, cyclohexyl methacrylate, vinyl acetate and N-vinyl-2-pyrrolidone.

The amount of monomer ($m_J$) used can be suitably selected in the range up to the amount (mol %) obtained by subtracting the amounts (mol %) of monomers ($m_T$) and ($m_L$) from the amount of all monomers (100 mol %). Of all monomers, the amount of monomer ($m_J$) used is suitably no more than 30 mol %, preferably no more than 20 mol %, or more preferably no more than 15 mol %. The art disclosed herein can be preferably practiced in an embodiment where the amount of monomer ($m_J$) used is 0 mol % or greater and below 10 mol % of all monomers, for instance, 0 mol % or greater and below 5 mol %. Here, that the amount of monomer ($m_J$) used is 0 mol % of all monomers means that no monomer ($m_J$) is used at least intentionally.

While no particular limitations are imposed, the calculated Tg of the acrylic polymer can be, for instance, −50° C. or higher. In some embodiments, from the standpoint of the removability of the paint-protective coating material in a high temperature range (e.g., around 70° C.), it is suitably −40° C. or higher, preferably −30° C. or higher, possibly −25° C. or higher, or even −20° C. or higher. From the standpoint of the removal workability (e.g., reduction of failed removal due to chipping and tearing of the paint-protective coating material) when removing the paint-protective coating material from paint layers in a low-temperature environment such as outdoors in winter, in some embodiments, the acrylic polymer's calculated Tg is suitably 10° C. or lower, preferably −9° C. or lower (e.g., −10° C. or lower), possibly −15° C. or lower, or even −20° C. or lower. When the protected object provided with the paint-protective coating material is exposed to changes in temperature, it is also advantageous that the acrylic polymer's calculated Tg is not excessively high in view of reducing cracking in the paint-protective coating material caused by a difference in linear expansion coefficient compared to the protected object, etc.

Here, the acrylic polymer's calculated Tg refers to the Tg value determined by the Fox equation based on the composition of the monomers used in synthesizing the polymer. As shown below, the Fox equation is a relational expression between the Tg of a copolymer and glass transition temperatures Tgi of homopolymers of the respective monomers constituting the copolymer.

$$1/Tg=\Sigma(Wi/Tgi)$$

In the Fox equation, Tg represents the glass transition temperature (unit: K) of the copolymer, Wi the weight fraction (copolymerization ratio by weight) of a monomer i in the copolymer, and Tgi the glass transition temperature (unit: K) of homopolymer of the monomer i.

As the glass transition temperatures of homopolymers used for determining the calculated Tg value, values found in publicly known documents are used. For example, with respect to the monomers listed below, as the glass transition temperatures of homopolymers of the monomers, the following values are used:

| | |
|---|---|
| n-butyl acrylate | −55° C. |
| acrylonitrile | 97° C. |
| vinyl acetate | 32° C. |
| methyl methacrylate | 105° C. |
| acrylic acid | 106° C. |

With respect to the glass transition temperatures of homopolymers of monomers other than those listed above, values given in "*Polymer Handbook*" (3rd edition, John Wiley & Sons, Inc., Year 1989) are used. When no homopolymer Tg values are given in known documents, values obtained by the method according to Japanese Patent Application Publication No. 2007-51271 are used. In particular, to a reaction vessel equipped with a thermometer, a stirrer, a nitrogen inlet and a condenser, are added 100 parts by weight of monomer, 0.2 part by weight of azobisisobutyronitrile, and 200 parts by weight of ethyl acetate as a polymerization solvent, and the mixture is stirred for one hour under a nitrogen gas flow. After oxygen is removed in this way from the polymerization system, the mixture is heated to 63° C. and the reaction is carried out for 10 hours. Then, it is cooled to room temperature, and a homopolymer solution having 33% by mass solids content is obtained. Then, this homopolymer solution is applied onto a release liner by flow coating and allowed to dry to prepare a test sample (a sheet of homopolymer) of about 2 mm thickness. This test sample is cut out into a disc of 7.9 mm diameter and is placed between parallel plates; and while applying a shear strain at a frequency of 1 Hz using a rheometer (model name ARES available from TA Instruments, Japan), the viscoelasticity is measured in the shear mode over a temperature range of −70° C. to 150° C. at a heating rate of 5° C./min; and the peak temperature of the tan δ curve is taken as the Tg of the homopolymer.

In some embodiments, the acrylic polymer's SP value is suitably greater than 9.5 (unit: $(cal/cm^3)^{1/2}$; the same applies hereinafter), preferably 10.0 or greater, or more preferably 10.5 or greater. As used herein, the SP value refers to the solubility parameter value determined from the basic structure of the compound by the method proposed by Fedors. Such an acrylic polymer's SP value can be far from (typically far above) the SP value of the paint layer to be protected. For instance, the paint layer can be a urethane-based paint layer formed upon reaction between an acrylic polyol resin and a polyisocyanate resin. With the acrylic polymer's SP value being far from the paint layer's SP value, the paint-protective coating material comprising the acrylic polymer tends to be less interactive with the paint layer. This is advantageous in view of reducing paint layer deformation caused by the paint-protective coating material as well as reducing failed removal and the rising removal workload due to the paint-protective coating material adhered too tightly to the paint layer. In some embodiments, the acrylic polymer's SP value can be 10.8 or higher, 11.2 or higher, or even 11.5 or higher. The maximum SP value of the acrylic polymer is not particularly limited. For instance, it is suitably 14.0 or lower, possibly 13.5 or lower, 13.0 or lower, below 12.5, or even below 12.0.

(Synthesis of Acrylic Polymer)

The method for obtaining an acrylic polymer from monomers as those described above is not particularly limited. Known polymerization methods can be suitably employed, such as emulsion polymerization, solution polymerization, bulk polymerization, and suspension polymerization. It is also possible to employ photopolymerization involving irradiation of light such as UV (typically carried out in the presence of a photopolymerization initiator) and active energy ray irradiation polymerization such as radiation polymerization involving irradiation of radioactive rays such as β rays and γ rays. In some preferable embodiments, the acrylic polymer is obtained by emulsion polymerization of monomers having an aforementioned composition. As the monomer supply method in emulsion polymerization, a suitable method can be employed among the all-at-once method where all the starting monomer mixture is supplied in one portion, gradual supply method, portion-wise supply method, etc. An emulsion of some or all of the monomers pre-mixed with water and emulsifier can be supplied to the polymerization vessel.

The polymerization temperature can be suitably selected in accordance with the monomer species, the solvent species, and the polymerization initiator species used, etc. The polymerization temperature is suitably about 20° C. or higher, preferably about 40° C. or higher, more preferably about 50° C. or higher; it can also be about 60° C. or higher, about 65° C. or higher, or even about 70° C. or higher. The polymerization temperature is suitably about 170° C. or lower (typically about 140° C. or lower), or preferably about 95° C. or lower (e.g. about 85° C. or lower). In emulsion polymerization, the polymerization temperature is preferably about 95° C. or lower (e.g. about 85° C. or lower).

The solvent (polymerization solvent) used for solution polymerization can be suitably selected among heretofore known organic solvents. For instance, aromatic compounds (typically aromatic hydrocarbons) such as toluene, acetic acid esters such as ethyl acetates, aliphatic and alicyclic hydrocarbons such as hexane and cyclohexane are preferably used.

In the polymerization, a known or commonly used thermal polymerization initiator or photopolymerization initiator can be used in accordance with the polymerization method and polymerization conditions. For the polymerization initiator, solely one species or a combination of two or more species can be used.

While no particular limitations are imposed, as the thermal polymerization initiator, it is possible to use, for example, an azo-based initiator, peroxide-based initiator or redox-based initiator by the combination of a peroxide and a reducing agent.

Examples of azo-based initiators include 2,2'-azobisisobutyronitrile, 2,2'-azobis[N-(2-carboxyethyl)-2-methylpropionamidine] hydrate, 2,2'-azobis(2-methylpropionamidine) disulfate salt, 2,2'-azobis(2-methylpropionamidine) dihydrochloride, 2,2'-azobis(2-methylpropionamidine) dihydrochloride, 2,2'-azobis[2-(5-methyl-2-imidazolin-2-yl)propane] dihydrochloride and 2,2'-azobis(N,N'-dimethylene isobutylamidine) dihydrochloride.

Examples of peroxide-based initiators include persulfates such as potassium persulfate and ammonium persulfate; benzoyl peroxide, t-butyl hydroperoxide, di-t-butyl peroxide, dicumyl peroxide, dilauroyl peroxide, di-n-octanoyl peroxide, di(4-methylbenzoyl) peroxide, t-butyl peroxybenzoate, t-butyl peroxyisobutyrate, t-hexyl peroxypivalate, t-butyl peroxypivalate, di(2-ethylhexyl) peroxydicarbonate, di(4-t-butylcyclohexyl) peroxydicarbonate, di-sec-butyl peroxydicarbonate, t-butyl peroxyneodecanoate, 1,1,3,3-tetramethyl butylperoxy-2-ethylhexanoate, 1,1-bis(t-butylperoxy)-3,3,5-trimethylcyclohexane, 1,1-bis(t-butylperoxy) cyclododecane, 1,1-bis(t-hexylperoxy)cyclohexane and hydrogen peroxide.

Examples of redox-based initiators include a combination of a peroxide and ascorbic acid (combination of hydrogen peroxide water and ascorbic acid, etc.), a combination of a peroxide and an iron(II) salt (combination of hydrogen peroxide water and an iron(II) salt, etc.), and a combination of a persulfate salt and sodium hydrogen sulfite.

The photopolymerization initiator is not particularly limited. It is possible to use, for instance, ketal-based photopolymerization initiators, acetophenone-based photopolymerization initiators, benzoin ether-based photopolymerization initiators, acylphosphine oxide-based photopolymerization initiators, α-ketol photopolymerization initiators, aromatic sulphonyl chloride-based photopolymerization initiators, photoactive oxime-based photopolymerization initiators, benzoin-based photopolymerization initiators, benzylic photopolymerization initiators, benzophenone-based photopolymerization initiators, and thioxanthone-based photopolymerization initiators.

The polymerization initiator can be used in a usual amount in accordance with the polymerization method, embodiment of polymerization, etc., and there are no particular limitations to the amount. For instance, relative to 100 parts by weight of monomers to be polymerized, about 0.001 part to 5 parts by weight (typically about 0.01 part to 2 parts by weight, e.g. about 0.01 part to 1 part by weight) of polymerization initiator can be used.

For the polymerization, as necessary, various heretofore known chain transfer agents (which can be considered also as a molecular weight-adjusting agent or polymerization degree-adjusting agent) can be used. For the chain transfer agent, solely one species or a combination of two or more species can be used. As the chain transfer agent, mercaptans can be used, such as n-dodecyl mercaptan, t-dodecyl mercaptan and thioglycolic acid. Alternatively, a chain transfer agent free of sulfur atoms (a sulfur-free chain transfer agent) can be used as well. Specific examples of the sulfur-free chain transfer agent include anilines such as N,N-dimethylaniline and N,N-diethylaniline; terpenoids such as α-pinene and terpinolene; styrenes such as α-methylstyrene and α-methylstyrene dimer; compounds having benzylidenyl groups such as dibenzylidene acetone, cinnamyl alcohol and cinnamyl aldehyde; hydroquinones such as hydroquinone and naphthohydroquinone; quinones such as benzoquinone and naphthoquinone; olefins such as 2,3-dimethyl-2-butene and 1,5-cyclooctadiene; alcohols such as phenol, benzyl alcohol and allyl alcohol; and benzyl hydrogens such as diphenylbenzene and triphenylbenzene.

When using a chain transfer agent, it can be used in an amount of, for instance, about 0.01 part to 1 part by weight to 100 parts by weight of the monomers. The art disclosed herein can also be preferably implemented in an embodiment that uses no chain transfer agent.

Emulsion polymerization is usually carried out in the presence of an emulsifier. The emulsifier used in the emulsion polymerization is not particularly limited; known anionic emulsifiers, nonionic emulsifiers and the like can be used. These emulsifiers can be used singly as one species or in a combination of two or more species.

Non-limiting examples of anionic emulsifiers include sodium lauryl sulfate, ammonium lauryl sulfate, sodium dodecyl benzene sulfonate, sodium polyoxyethylene lauryl sulfate, sodium polyoxyethylene alkyl ether sulfates, ammonium polyoxyethylene alkyl phenyl ether sulfates, sodium polyoxyethylene alkyl phenyl ether sulfates, and sodium polyoxyethylene alkyl sulfosuccinates. Non-limiting examples of non-ionic emulsifiers include polyoxyethylene alkyl ethers, polyoxyethylene alkyl phenyl ethers, polyoxyethylene aliphatic acid esters, and polyoxyethylene-polyoxypropylene block polymers. Reactive functional group-containing emulsifiers (reactive emulsifiers) can be used as well. Examples of reactive emulsifiers include a radically polymerizable emulsifier having a structure of an aforementioned anionic emulsifier or nonionic emulsifier with a radically polymerizable group such as propenyl group and ally ether group introduced therein.

In the emulsion polymerization, the emulsifier can be used in an amount of, for instance, 0.2 part by weight or greater, 0.5 part by weight or greater, or 1.0 part by weight or greater, or even 1.5 parts by weight or greater, relative to 100 parts by weight of the monomers. In some embodiments, the amount of emulsifier used is usually suitably 10 parts by weight or less to 100 parts by weight of the monomers, preferably 5 parts by weight or less, or possibly even 3 parts by weight or less.

Emulsion polymerization can also be carried out in the presence of a protective colloid. Examples of the protective colloid include polyvinyl alcohols such as a partially-saponified polyvinyl alcohol, fully-saponified polyvinyl alcohol and modified polyvinyl alcohol; cellulose derivatives such as hydroxyethyl cellulose, hydroxypropyl cellulose and carboxymethyl cellulose; and natural polysaccharides such as guar gum. The partially saponified polyvinyl alcohol has a saponification degree typically below 95 mol %, possibly below 92 mol %, or even below 90 mol %. The minimum saponification degree of the partially saponified polyvinyl alcohol is not particularly limited. From the standpoint of the emulsion stability, etc., it is suitably 65 mol % or higher, preferably 70 mol % or higher, or more preferably 80 mol % or higher (e.g., 85 mol % or higher). Examples of the modified polyvinyl alcohol include an anionic modified polyvinyl alcohol having an anionic group such as a carboxy group and a sulfonic acid group; and a cationic modified polyvinyl alcohol having a cationic group such as a quaternary ammonium salt. For instance, the modified polyvinyl alcohol has a saponification degree below 98 mol %, possibly below 95 mol %, below 92 mol %, or even below 90 mol %. The minimum saponification degree of the modified polyvinyl alcohol can be, for instance, 55 mol % or higher. From the standpoint of the emulsion stability, etc., it is suitably 65 mol % or higher, preferably 70 mol % or higher, or more preferably 80 mol % or higher (e.g., 85 mol % or higher). For the protective colloid, solely one species or a combination of two or more species can be used.

The amount of protective colloid used to 100 parts by weight of monomers is suitably 0.1 part by weight or greater, preferably 0.5 part by weight or greater (e.g., 0.7 part by weight or greater) and suitably 10 parts by weight or less, or preferably 5 parts by weight or less (e.g., 3 parts by weight or less, or 2 parts by weight or less). The use of the protective colloid is preferably combined with an aforementioned emulsifier, but not limited to this. The protective colloid can be used without using an emulsifier. For instance, emulsion polymerization can be carried out in the following embodiment: water and a protective colloid are placed into a polymerization vessel; monomers are partially or entirely pre-mixed and emulsified with water and an emulsifier; and the resulting emulsion is supplied to the polymerization vessel. When using an anionic protective colloid (e.g., anionic polyvinyl alcohol) and an emulsifier together, from the standpoint of the polymerization stability and like, as the emulsifier, it is preferable to use one, two or more species selected from the group of anionic emulsifiers and nonionic emulsifiers.

In some preferable embodiments, emulsion polymerization is carried out in the presence of an anionic modified polyvinyl alcohol. Aqueous acrylic polymer emulsions obtained by such emulsion polymerization tend to bring about thickening effect upon addition of thickeners. With the use of such an aqueous acrylic polymer emulsion, an acrylic coating composition can be favorably prepared, showing good viscometric properties suited for slot-die coating. Favorable examples of the anionic modified polyvinyl alcohol include sulfonic acid-modified polyvinyl alcohols and carboxylated polyvinyl alcohols. For instance, a sulfonic acid-modified polyvinyl alcohol and/or a carboxylated polyvinyl alcohol can be preferably used. An anionic modified polyvinyl alcohol can be used in combination with an emulsifier.

<Acrylic Coating Composition>

The acrylic coating composition disclosed herein comprises an aforementioned acrylic polymer as base polymer. The form of the acrylic coating composition is not particularly limited. For instance, it can be an aqueous emulsion-based composition in which the acrylic polymer is dispersed in an aqueous solvent, a solvent-based composition in which the acrylic polymer is dissolved in an organic solvent, etc. From the standpoint of the environmental hygiene, an aqueous emulsion-based coating composition is preferable. The following mainly describes the aqueous emulsion-based coating composition; however, the acrylic coating composition disclosed herein is not to be limited to the aqueous emulsion type.

In the aqueous emulsion-based coating composition, the aqueous solvent is water or a solvent mixture comprising water as the primary component (a component accounting for more than 50% by weight). The other solvent(s) forming the solvent mixture besides water can be one, two or more species selected from various water-miscible organic solvents (lower alcohols, etc.). In the aqueous solvent in this description, the water content is typically 90% by weight or higher, or preferably 95% to 100% by weight.

The coating composition disclosed herein can include various additives as desired. Examples of the additives include known thickener, thixotropic agent, dispersing agent, defoaming agent and inorganic powder. For instance, by adding various additives to an aqueous emulsion (polymerization reaction mixture) of acrylic polymer obtained by emulsion polymerization as described above, an aqueous emulsion-based coating composition cam be prepared. Alternatively, as the coating composition, aqueous emulsion of the acrylic polymer can be used as is or after pH adjustment (e.g. pH adjusted to about 6 to 8 by addition of ammonia water) and/or concentration adjustment (e.g. NV adjusted to about 40% to 60% by weight by addition of water).

Inorganic powder is included in the coating composition to form an inorganic powder-containing coating material. According to such a coating material, with the inorganic powder blocking light such as UV rays, photodegradation can be inhibited in the coating material itself as well as in the paint layer protected with the coating material. As the inorganic powder, oxides such as titanium dioxide, zinc oxide, magnesium oxide, alumina and silica; carbonates such as calcium carbonate; sulfates such as barium sulfate; and the like can be used. Inorganic powder capable of coloring the paint-protective coating material in white is preferable. With the white-colored paint-protective coating material, for instance, the temperature rise in sunlight can be reduced to better inhibit degradation of the coating material and the paint layer.

The amount of inorganic powder used to 100 parts by weight of acrylic polymer can be, for instance, 0.5 part by weight or greater. From the standpoint of the light-blocking effect, it is suitably 1 part by weight or greater, preferably 2 parts by weight or greater, more preferably 3 parts by weight or greater, possibly 5 parts by weight or greater, 10 parts by weight or greater, 15 parts by weight or greater, or even 20 parts by weight or greater. The amount of inorganic powder used to 100 parts by weight of acrylic polymer can be, for instance, 100 parts by weight or less. From the standpoint of the coating material's strength and ease of coating, it is suitably 80 parts by weight or less, advantageously 60 parts by weight or less, preferably 50 parts by weight or less, possibly 40 parts by weight or less, or even 30 parts by weight or less.

In some preferable embodiments, the inorganic power comprises at least titanium dioxide ($TiO_2$) Titanium dioxide can also be used in combination with one, two or more species of other inorganic powder (e.g., calcium carbonate). The type of titanium dioxide is not particularly limited. For instance, titanium dioxide in any crystal form such as rutile, anatase and brookite can be used. In particular, rutile titanium dioxide is preferable. Titanium dioxide having coated particle surfaces can be used as well. The coating material of the titanium dioxide pal tides is not particularly limited. For instance, it can be an inorganic oxide such as silica, alumina and zinc oxide. Favorable examples include highly weather-resistant titanium dioxide (typically rutile titanium dioxide) having particle surfaces coated with $Si—Al_2O_3$, etc.

The amount of titanium dioxide used to 100 parts by weight of acrylic polymer can be, for instance, 0.1 part by weight or greater. From the standpoint of the light-blocking effect, it is suitably 0.5 part by weight or greater, preferably 1 part by weight or greater, more preferably 2 parts by weight or greater, or possibly even 3 parts by weight or greater. The amount of titanium dioxide used to 100 parts by weight of acrylic polymer is, for instance, possibly 30 parts by weight or less, suitably 20 parts by weight or less, preferably 15 parts by weight or less, possibly 10 parts by weight or less, or even 8 parts by weight or less.

The mean particle diameter of the inorganic powder is not particularly limited. For instance, from the standpoint of obtaining good light-blocking effect, the inorganic powder has a mean particle diameter of preferably 150 nm or greater, more preferably 180 nm or greater, possibly 220 nm or greater, or even 250 nm or greater. On the other hand, from the standpoint of the dispersity in resins, the mean particle diameter of the inorganic powder is suitably 2000 nm or less, preferably 1500 nm or less, more preferably 1000 nm or less (e.g., 800 nm or less), possibly 500 nm or less, 400 nm or less, or even 350 nm or less. For instance, it is preferable to use titanium dioxide particles having a mean particle diameter of about 250 nm to 350 nm.

Thickener may help adjust the viscometric properties of the coating composition. As the thickener, known thickeners can be used such as urethane-based thickeners, cellulose-based thickeners, polyether-based thickeners and acrylic thickeners. For the thickener, solely one species or a combination of two or more species can be used.

Examples of commercial urethane-based thickeners include product names RHEOBYK-H 3300VF, RHEOBYK-T 1010 and RHEOBYK-L 1400 available from BYK; product names ADEKA NOL UH-450VF, ADEKA NOL UH-420, ADEKA NOL UH-462, ADEKA NOL UH-472, ADEKA NOL UH-540, ADEKA NOL UH-756VF and ADEKA NOL UH-814N available from ADEKA; and product names SN-THICKENER 612, SN-THICKENER 621N, SN-THICKENER 625N, SN-THICKENER 627N and SN-THICKENER 660T available from San Nopco, Ltd. In some embodiments, as the urethane-based thickener, a urethane associative thickener can be preferably used.

Favorable examples of the urethane associative thickener include product names RHEOBYK-H 3300VF, RHEOBYK-T 1010 and RHEOBYK-L 1400 available from BYK; and product names ADEKA NOL UH-450VF and ADEKA NOL UH-420 available from ADEKA.

Examples of cellulose-based thickeners include hydroxyethyl cellulose, carboxymethyl cellulose and methyl cellulose. Examples of commercial products include product name SANHEC L available from Sansho Co., Ltd.

Examples of polyether-based thickeners include polyethylene glycol, polyether dialkyl esters, polyether dialkyl ethers and epoxidized polyether. Examples of commercial products include product name POLYOX WSR N-80 available from Dow Chemical Company.

Examples of acrylic thickeners include acrylate-based polymers such as sodium polyacrylate. Examples of commercial products include product names PRIMAL ASE-60, PRIMAL TT-615 and PRIMAL RM-5 available from Rohm and Haas Company; and product names SN-THICKENER 613, SN-THICKENER 618, SN-THICKENER 630, SN-THICKENER 634 and SN-THICKENER 636 available from San Nopco, Ltd.

The amount of thickener used is not particularly limited and can be suitably adjusted to obtain desirable viscometric properties. From the standpoint of reducing excessive influence on physical properties of the coating material, in some embodiments, the amount of thickener used to 100 parts by weight of acrylic polymer is suitably 15 parts by weight or less, preferably 10 parts by weight or less, more preferably 5 parts by weight or less (e.g., 3 parts by weight or less), possibly 2.5 parts by weight or less, or even 2 parts by weight or less. The minimum amount of thickener used is not particularly limited. For instance, to 100 parts by weight of acrylic polymer, it can be 0.01 part by weight or greater, 0.05 part by weight or greater, or even 0.1 part by weight or greater.

Thixotropic agent may help adjust the viscometric properties of the coating composition. As the thixotropic agent, an inorganic material can be used, for instance, bentonite, modified bentonite, montmorillonite, hectorite, etc. For the thixotropic agent, solely one species or a combination of two or more species can be used.

The amount of thixotropic agent used is not particularly limited and can be suitably adjusted to obtain desirable viscometric properties. From the standpoint of reducing excessive influence on physical properties of the coating material, in some embodiments, the amount of thixotropic agent used to 100 parts by weight of acrylic polymer is suitably 10 parts by weight or less, preferably 5 parts by weight or less, possibly 3 parts by weight or less, 2.5 parts by weight or less, or even 2 parts by weight or less. The minimum amount of thixotropic agent used is not particularly limited. For instance, to 100 parts by weight of acrylic polymer, it can be 0.01 part by weight or greater, 0.05 part by weight or greater, or even 0.1 part by weight or greater.

The thixotropic agent may also serve as a thickener. These thickener and thixotropic agent can be used together, or just one of them can be used. When using a thickener and thixotropic agent together, their combined amount used to 100 parts by weight of acrylic polymer can be, for instance, 15 parts by weight or less, 10 parts by weight or less, 5 parts by weight or less, 4 parts by weight or less, or even 2.5 parts by weight or less; and 0.01 part by weight or greater, 0.05 part by weight or greater, or 0.1 part by weight or greater.

As for the method for applying the coating composition onto the paint layer of the object to be protected, it is possible to employ application with a coater such as a die coater and spray coater as well as roller coating, dip coating, etc. The die coating can be carried out by a coating system including a robot arm equipped with a slit die. For instance, by controlling the robot arm to extrude the coating composition into continuous liquid film (in ribbon form) while allowing the slit die to move along the shape of the object to be protected, even when the object has a non-flat shape (e.g., a complex three-dimensional shape such as an automobile body shell), the coating composition can be applied efficiently and precisely onto the object.

From the standpoint of increasing the efficiency and precision of coating material formation, the applied coating composition is preferably dried with heat. The drying temperature can be, for instance, about 40° C. to 100° C. and is typically preferably about 60° C. to 90° C.

While no particular limitations are imposed, from the standpoint of the ease of application and coating thickness management, etc., the non-volatile content (NV) of the coating composition is suitably about 25% to 75% by weight or preferably about 30% to 70% by weight. The NV can be adjusted through the amount of solvent (e.g., aqueous solvent) used. For instance, the NV of the coating composition can be adjusted through adjustment of the amount of water used in emulsion polymerization or addition of water after completion of emulsion polymerization.

The thickness of the paint-protective coating material is not particularly limited. From the standpoint of enhancing the protective effect, it is suitably 20 μm or greater. From the standpoint of the strength and removal workability, it is preferably 50 μm or greater, or more preferably 70 μm or greater (e.g., 85 μm or greater). The thickness of the coating material can be adjusted through the applied amount and NV of the coating composition. From the standpoint of the drying efficiency and sagging prevention of the applied composition, the thickness of the paint-protective coating material is suitably 300 μm or less, preferably 200 μm or less, or more preferably 150 μm or less.

(BH Viscosity)

In some embodiments, determined at 2 rpm using a BH viscometer, the coating composition has a viscosity $V_1$ of suitably 20 Pa·s or higher, preferably 40 Pa·s or higher, or more preferably 55 Pa·s or higher. With increasing viscosity $V_1$ determined at such a low shear rate, the anti-sag properties of the coating composition applied on the object to be protected tends to improve. On the other hand, from the standpoint of the defoaming properties and leveling properties of the coating composition, the coating composition's viscosity $V_1$ is suitably 200 Pa·s or lower, preferably 150 Pa·s or lower, or more preferably 100 Pa·s or lower (e.g., 80 Pa·s or lower).

Determined at 20 rpm using a BH viscometer, the coating composition has a viscosity $V_3$ which is not particularly limited and can be, for instance, about 5 Pa·s to 50 Pa·s. When the viscosity $V_3$ is in this range, an aforementioned $V_1$ value is likely to be obtained. The BH viscosity (viscosity determined with a BH viscometer) of the coating composition is determined according to the method described later in Examples.

(Rheometer Viscosity)

In some embodiments, determined using a cone plate rheometer, the coating composition has a viscosity $V_2$ at a shear rate of 100 $\sec^{-1}$ of preferably 1.0 Pa·s or higher, more preferably 1.3 Pa·s or higher, possibly 1.5 Pa·s or higher, 2.0 Pa·s or higher, or even 2.3 Pa·s or higher. When the viscosity $V_2$ determined at such a high shear rate is at least the prescribed values, the slot-die applicability (die-coating properties) can be increased. The maximum viscosity $V_2$ is not particularly limited. From the standpoint of the ease of combining with defoaming properties and ease of fluid feeding, it is suitably 15 Pa·s or lower, preferably 10 Pa·s or lower, possibly 8.5 Pa·s or lower, or even 6.0 Pa·s or lower. The rheometer viscosity (viscosity determined with a rheometer) of the coating composition is determined according to the method described later in Examples.

<Paint-Protective Coating Material>

The paint-protective coating material disclosed herein can be formed using a coating composition as those described above. For instance, the coating composition is applied (preferably slot-die coated) onto a paint layer of an object to be protected and allowed to dry. By this, for instance, as shown in FIG. 1, a paint-protective coating material 10 formed from the coating composition can be formed on a paint layer 22 of an object 20 to be protected.

The paint-protective coating material has a storage modulus at 23° C. (G'(23)) of preferably 150 MPa or higher, more preferably 180 MPa or higher, possibly 230 MPa or higher, or even 250 MPa or higher. The coating material having a G'(23) of at least the prescribed values tends to be less susceptible to tearing and excessive elongation while being peeled off the paint layer in a room temperature range. This is advantageous in view of increasing the removability. In some embodiments, G'(23) is suitably about 1000 MPa or lower. From the standpoint of reducing marking on paint layers, it is also advantageous that G'(23) is not excessively high. It is also preferable in view of removal workability because it facilitates the initial action to start removing the coating material from the paint layer (e.g., scratching an edge of the coating material with a fingernail, etc., for lifting from the paint layer). In some embodiments, G'(23) can be 800 MPa or lower, 700 MPa or lower, 600 MPa or lower, 500 MPa or lower, or even 400 MPa or lower.

The paint-protective coating material has a storage modulus at 70° C. (G'(70)) of suitably 0.40 MPa or higher, or preferably 0.45 MPa or higher. The coating material having a G'(70) of at least the prescribed values can be suitably removed from paint layers without excessive softening even at a temperature higher than room temperature, such as when the protected object provided with the coating material is placed outdoors in summer. From the standpoint of enhancing the removability at high temperatures, in some embodiments, G'(70) is advantageously 0.5 MPa or higher, preferably 0.70 MPa or higher, possibly 1.0 MPa or higher, or even 1.2 MPa or higher. The maximum G'(70) is not particularly limited. From the standpoint of obtaining an aforementioned G'(23) value, it is suitably 5 MPa or lower, preferably 3 MPa or lower, possibly 2.5 MPa or lower, or even 2.0 MPa or lower. In some embodiments, G'(70) can also be 1.5 MPa or lower, or even 1.2 MPa or lower. From the standpoint of reducing marking on paint layers, it is also advantageous that G'(70) is not excessively high.

The storage moduli of the paint-protective coating material at 23° C., 70° C. and other temperatures are determined according to the method described later in Examples.

In some embodiments of the paint-protective coating material disclosed herein, determined as the tan δ peak temperature in viscoelastic analysis, the coating material has a glass transition temperature (or "RSA-Tg" hereinafter) of suitably 20° C. or higher, preferably 30° C. or higher, or more preferably 34° C. or higher. RSA-Tg can be, for instance, 50° C. or lower, 45° C. or lower, or even 43° C. or lower (e.g., 41° C. or lower). The paint-protective coating material having an RSA-Tg value in these ranges is likely to satisfy the aforementioned G'(23) and G'(70) values.

Determined as the temperature corresponding to the inflection point of loss modulus G" in viscoelastic analysis, the coating material according to some embodiments has a glass transition temperature (or "RSA-Tg(G")" hereinafter) of suitably 5° C. or higher, preferably 15° C. or higher, or more preferably 20° C. or higher. RSA-Tg(G") can be, for instance, 40° C. or lower, 35° C. or lower, or even 30° C. or lower (e.g., 25° C. or lower). The paint-protective coating material having an RSA-Tg(G") value in these ranges is likely to satisfy the aforementioned G'(23) and G'(70) values. Examples A1 to A10 described later had the following RSA-Tg(G") values: 20.2° C. (A1), 21.2° C. (A2), 21.8° C. (A3), 22.3° C. (A4), 24.5° C. (A5), 22.2° C. (A6), 5.5° C. (A7), 17.5° C. (A8), 34.8° C. (A9) and 37.2° C. (A10).

Determined by the tensile test described later in Examples, the paint-protective coating material disclosed herein has a breaking strength of suitably 20 N/25 mm or greater, or preferably 30 N/25 mm or greater.

Determined by the tensile test described later in Examples, the paint-protective coating material disclosed herein has an yield strength of suitably 2 N/25 mm or greater and 12 N/25 mm or less, or preferably 4 N/25 mm or greater and 10 N/25 mm or less.

Determined by the tensile test described later in Examples, the paint-protective coating material disclosed herein has an elongation at break (break elongation) of suitably 150% or higher, or preferably 250% or higher. For instance, the maximum break elongation is suitably 500% or lower. Such coating material can suitably deform during removal from paint layers for stress distribution; and therefore, the coating material can be inhibited from breaking due to local stress concentration.

From the standpoint of the workability during removal from paint layers, the paint-protective coating material combines well-balanced breaking strength, yield strength and break elongation (e.g. scoring at least 1 point on all test grades described later in Examples) is preferable.

This Description provides a paint protection method comprising the following: preparing a coating composition comprising an acrylic polymer as base polymer, applying the coating composition onto a paint layer of an object to be protected, and drying the coating composition to form a paint-protective coating material that temporarily protects the paint layer.

Figure 2:
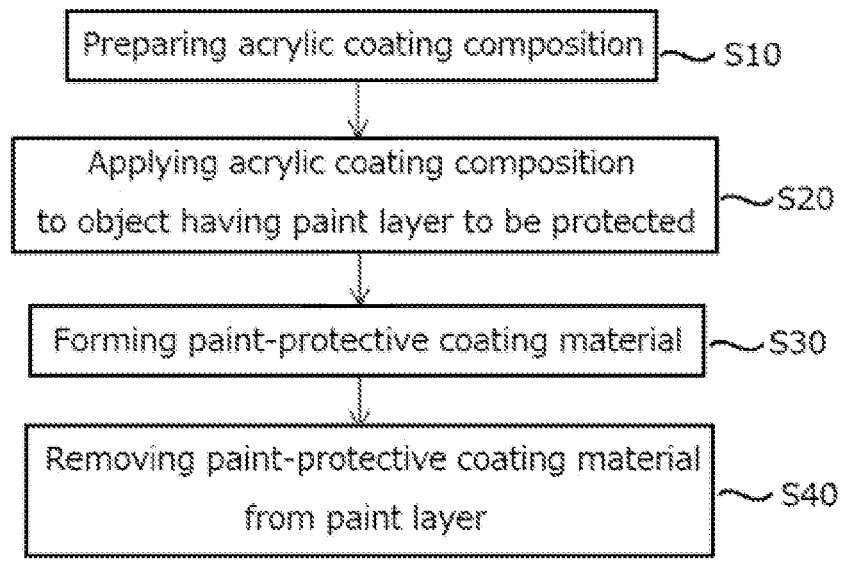
FIG. 2 shows a block chart illustrating an embodiment of the paint protection method according to this invention.

An embodiment of the paint protection method is described with reference to FIG. 2. In particular, an acrylic coating composition disclosed herein is prepared (step S10). The coating composition is applied (e.g., slot-die coated) onto a paint layer of an object to be protected (step S20). The applied coating composition is allowed to dry to form a paint-protective coating material that temporarily protects the paint layer (step S30). By thus providing the coating material onto the paint layer, the paint layer can be protected from damage and degradation. The coating material after serving the protective role is removed (e.g., peeled away) from the paint layer when desired (step S40).

The matters disclosed by this description include the following:

(1) A paint-protective coating material formed from an acrylic coating composition comprising an acrylic polymer as base polymer, wherein
the acrylic polymer is formed from monomers comprising a monomer ($m_T$) having a homopolymer glass transition temperature of 90° C. or higher and a monomer ($m_L$) having a homopolymer glass transition temperature of −30° C. or lower, with the monomer ($m_T$) comprising at least acrylonitrile, in the monomers, the monomer ($m_T$) and the monomer ($m_L$) have a molar ratio ($m_T/m_L$) of 0.8 or higher and 1.5 or lower, and the paint-protective coating material has a storage modulus at 23° C. of 150 MPa or higher and 1000 MPa or lower and a storage modulus at 70° C. of 0.40 MPa or higher.

(2) The paint-protective coating material according to (1) above, wherein the acrylic polymer has a glass transition temperature of −30° C. or higher and −5° C. or lower, calculated based on the monomer composition.

(3) The paint-protective coating material according to (1) or (2) above, wherein the monomers comprise more than 50% acrylonitrile by mole.

(4) The paint-protective coating material according to any of (1) to (3) above, further comprising 1 part to 60 parts by weight of an inorganic powder to 100 parts by weight of the acrylic polymer.

(5) The paint-protective coating material according to (4) above, wherein the inorganic powder comprises titanium dioxide.

(6) The paint-protective coating material according to any of (1) to (5) above, wherein the acrylic coating composition is in aqueous emulsion form in which the acrylic polymer is dispersed in an aqueous solvent.

(7) The paint-protective coating material according to any of (1) to (6) above, comprising an anionic polyvinyl alcohol.

(8) The paint-protective coating material according to any of (1) to (7) above, comprising a thickener.

(9) The paint-protective coating material according to any of (1) to (8) above, having a thickness of 20 μm or greater and 300 μm or less.

(10) An acrylic coating composition for forming a paint-protective coating material, wherein the acrylic coating composition comprises an acrylic polymer as base polymer, the acrylic polymer is formed from monomers comprising a monomer ($m_T$) having a homopolymer glass transition temperature of 90° C. or higher and a monomer ($m_L$) having a homopolymer glass transition temperature of −30° C. or lower, with the monomer ($m_T$) comprising at least acrylonitrile, and in the monomers, the monomer ($m_T$) and the monomer ($m_L$) have a molar ratio ($m_T/m_L$) of 0.8 or higher and 1.5 or lower.

(11) The acrylic coating composition according to (10) above, that forms a paint-protective coating material having a storage modulus at 23° C. of 150 MPa or higher and 1000 MPa or lower and a storage modulus at 70° C. of 0.40 MPa or higher.

(12) The paint-protective coating material or the acrylic coating composition according to (10) or (11) above, wherein the acrylic polymer has a glass transition temperature of −30° C. or higher and −5° C. or lower, calculated based on the monomer composition.

(13) The acrylic coating composition according to any of (10) to (12) above, wherein the monomers comprise more than 50% acrylonitrile by mole.

(14) The acrylic coating composition according to any of (10) to (13) above, further comprising 1 part to 60 parts by weight of an inorganic powder to 100 parts by weight of the acrylic polymer.

(15) The acrylic coating composition according to (14) above, wherein the inorganic powder comprises titanium dioxide.

(16) The paint-protective coating material or the acrylic coating composition according to any of (10) to (15) above, wherein the acrylic coating composition is in aqueous emulsion form in which the acrylic polymer is dispersed in an aqueous solvent.

(17) The acrylic coating composition according to any of (10) to (16) above, wherein the acrylic polymer is a product of emulsion polymerization in the presence of a protective colloid.

(18) The acrylic coating composition according to (17) above, wherein the protective colloid is an anionic polyvinyl alcohol.

(19) The acrylic coating composition according to any of (10) to (18) above, further comprising a thickener.

(20) The acrylic coating composition according to any of (10) to (19), the acrylic coating composition having a viscosity $V_1$ of 20 Pa·s or higher and 200 Pa·s or lower, determined at 2 rpm using a BH viscometer; and a viscosity $V_2$ of 1.0 Pa·s or higher at a shear rate of 100 sec$^{-1}$, determined using a cone plate rheometer.

(21) A paint protection method, the method comprising preparing an acrylic coating composition comprising an acrylic polymer as base polymer, applying the acrylic coating composition to a paint layer of an object to be protected, and drying the acrylic coating composition to form a paint-protective coating material that temporarily protects the paint layer; wherein the acrylic polymer is formed from monomers comprising a monomer ($m_T$) having a homopolymer glass transition temperature of 90° C. or higher and a monomer ($m_L$) having a homopolymer glass transition temperature of −30° C. or lower, with the monomer ($m_T$) comprising at least acrylonitrile, and in the monomers, the monomer ($m_T$) and the monomer ($m_L$) have a molar ratio ($m_T/m_L$) of 0.8 or higher and 1.5 or lower.

(22) The paint protection method according to (21) above, wherein the paint-protective coating material is the paint-protective coating material according to any of (1) to (9) above.

(23) The paint protection method according to (21) or (22) above, that uses, as the acrylic coating composition, the acrylic coating composition according to any of (10) to (20) above.

(24) The paint protection method according to any of (21) to (23) above, wherein the acrylic coating composition is applied with a slot die.

EXAMPLES

Several working examples relating to the present invention are described below, but the present invention is not intended to be limited to these examples. In the description below, "parts" and "%" are by weight unless otherwise specified. The amounts of the respective materials used are based on active ingredients unless otherwise noted.

Experiment 1

<Preparation of Coating Compositions>

Example A1

Were mixed 66.4 parts (45 mol %) of n-butyl acrylate (BA), 33.6 parts (55 mol %) of acrylonitrile (AN), 0.05 part of n-lauryl mercaptan, 2 parts of sodium polyoxyethylene lauryl sulfate (product name LATEMULE118B available from Kao Corporation) and 40 parts of ion-exchanged water.

While purging with nitrogen, the mixture was emulsified with an emulsifying machine (homo-mixer) to prepare a monomer emulsion.

Into a reaction vessel equipped with a condenser, nitrogen inlet, thermometer and stirrer, was placed 50 parts of ion-exchanged water. To this, was added 1 part of an anionic modified polyvinyl alcohol (product name GOHSENX L-3266 available from Nihon Gosei Kako, Ltd.; saponification degree: 86.5-89.0 mol %), dissolved at room temperature while purging with nitrogen, and then heated to 60° C. To this, was added, as a polymerization initiator, 0.1 part of 2,2'-azobis[N-(2-carboxyethyl)-2-methylpropion amidine] hydrate (product name VA-057 available from Wako Pure Chemical industries, Ltd.). While keeping the liquid temperature around 60° C. in the reaction vessel, was added the monomer emulsion over three hours to carry out polymerization reaction. After completion of addition of the monomer emulsion, the reaction mixture was maintained and allowed to cure at the same temperature for three more hours. The system was allowed to cool to room temperature and then with addition of 10% ammonium water, it was adjusted to pH 7.5 to obtain an aqueous emulsion of acrylic polymer. The aqueous emulsion was used as the acrylic coating composition according to this Example.

Examples A2 to A10

The monomer species and amounts used were changed as shown in Table 1. Otherwise in the same manner as Example A1, were obtained aqueous acrylic polymer emulsions (acrylic coating compositions) according to the respective Examples.

<Measurements and Evaluations>

[Tensile Test]

Was horizontally held a painted steel plate with the painted face up, the steel plate coated with an acid epoxy crosslinked acrylic paint (product name KINO1210TW available from Kansai Paint Co., Ltd.). Onto the painted face of the painted steel plate, using an applicator available from TP Giken Co., Ltd., was applied the coating composition according to each Example and allowed to dry at 80° C. for three minutes to form film (a paint-protective coating material). The coating composition was applied in an amount to obtain a thickness of 100 μm by non-volatiles. At room temperature, the resulting film was peeled from the painted steel plate and cut into a 25 mm wide and 100 mm long strip to prepare a measurement sample for tensile testing.

In an environment at 23° C. and 50% RH, the measurement sample was set in a tensile tester (system name TENSILON available from Shimadzu Corporation). Tensile tests were carried out at a reference line of 50 mm at a tensile speed of 0.3 m/min to determine the breaking strength (N/25 mm), yield strength (N/25 mm) and break elongation.

Table 1 shows the results classified based on the following grades:

(Break Strength)
  3 points: ≥30 N/25 mm
  2 points: ≥20 N/25 mm, <30 N/25 mm
  1 point: <20 N/25 mm (Yield Strength)
  3 points: ≥4 N/25 mm, <10 N/25 mm
  2 points: ≥2 N/25 mm, <4 N/25 mm; or ≥10 N/25 mm, <12 N/25 mm
  1 point: <2 N/25 mm or >12 N/25 mm (Break Elongation)
  3 points: ≥250%
  2 points: ≥150%, <250%
  1 point: <150%

[Removal Workability]

The resulting test points on the breaking strength, yield strength and break elongation were combined. Based on the total score, the removal workability at room temperature was evaluated according to the three grades shown below. The results are shown in Table 1.

7 points or higher: G (Good; good removal workability)
  5 to 6 points: A (Acceptable; practically acceptable removal workability)
  4 points or lower: P (Poor; poor removal workability)

[Determination of Storage Moduli]

Using the coating composition according to each Example, similar to the film preparation for the tensile testing, 100 μm thick film was formed on the painted steel plate. At room temperature, the resulting film was peeled from the painted steel plate. Several sheets of this film were layered and united into one body with pressure applied to prepare an approximately 1 mm thick laminate film. Of the laminate film, was punched out a disc of 7.9 mm diameter and placed between parallel plates. While applying a shear strain at a frequency of 1 Hz using a rheometer (model name ARES G2 available from TA Instruments, Inc.), the viscoelasticity was measured in the shear mode over a temperature range of −70° C. to 150° C. at a heating rate of 5° C./min. At the respective temperatures, the storage moduli G' were determined. The results are shown in Table 1.

[RSA-Tg]

By the viscoelastic analysis, the tan δ peak temperature was determined. Table 1 shows the temperature as RSA-Tg.

[Removability at 70° C.]

To the painted steel plate, using an applicator available from TP Giken Co., Ltd., was applied the coating composition according to each Example and allowed to dry at 80° C. for three minutes to form film (a paint-protective coating material). Subsequently, the painted steel plate was placed into an incubator at 70° C.; at this temperature, the film was removed from the painted steel plate and the removability was evaluated according to the following two grades.

G (Good): film removable (good removability at 70° C.)
  P (Poor): film non-removable with stretching and tearing (poor removability at 70° C.)

TABLE 1

|  |  | Example | | | | | | | | | |
|---|---|---|---|---|---|---|---|---|---|---|---|
|  |  | A1 | A2 | A3 | A4 | A5 | A6 | A7 | A8 | A9 | A10 |
| Monomers | BA | 66.4 (45) | 63.6 (42) | 66.0 (45) | 65.9 (46) | 64.1 (43) | 66.3 (52) | 83.8 (70) | 75.8 (61) | 57.6 (36) | 58.5 (52) |
| [parts | AN | 33.6 (55) | 36.4 (58) | 31.6 (52) | 26.1 (44) | 33.3 (54) | 15.8 (30) | 13.4 (27) | 15.4 (30) | 42.4 (64) | 0 |
| (mol %)] | MMA | 0 | 0 | 0 | 0 | 0 | 17.9 (18) | 2.8 (3) | 8.7 (9) | 0 | 39.6 (45) |
|  | AA | 0 | 0 | 2.5 (3) | 8.1 (10) | 2.5 (3) | 0 | 0 | 0 | 0 | 1.9 (3) |

TABLE 1-continued

|  |  | Example | | | | | | | | | |
|---|---|---|---|---|---|---|---|---|---|---|---|
|  |  | A1 | A2 | A3 | A4 | A5 | A6 | A7 | A8 | A9 | A10 |
| Molar ratio ($m_T/m_L$) | | 1.22 | 1.38 | 1.22 | 1.17 | 1.33 | 0.92 | 0.43 | 0.64 | 1.78 | 0.92 |
| Calculated Tg (° C.) | | −20.1 | −16.7 | −19.5 | −19.1 | −17.2 | −19.3 | −39.4 | −30.7 | −9.0 | −8.6 |
| RSA-Tg (° C.) | | 34 | 36 | 35 | 38 | 41 | 41 | 21 | 32 | 46 | 44 |
| SP value | | 11.8 | 11.9 | 11.8 | 11.7 | 11.9 | 10.6 | 10.4 | 10.5 | 12.2 | 9.3 |
| Tensile tests 23° C. (points) | Breaking strength | 3 | 3 | 3 | 3 | 3 | 3 | 1 | 1 | 1 | 1 |
|  | Yield strength | 3 | 2 | 3 | 3 | 3 | 3 | 1 | 1 | 1 | 1 |
|  | Break elongation | 3 | 3 | 3 | 3 | 3 | 3 | 3 | 3 | 1 | 3 |
| Total score | | 9 | 8 | 9 | 9 | 9 | 9 | 5 | 5 | 3 | 5 |
| Storage moduli (MPa) | −30° C. | 1400 | 2200 | 1500 | 960 | 960 | 1300 | 1100 | 1700 | 1800 | 2500 |
|  | 23° C. | 190 | 500 | 220 | 450 | 390 | 440 | 4.1 | 130 | 1500 | 48 |
|  | 60° C. | 1.1 | 1.3 | 1.1 | 1.4 | 1.2 | 0.87 | 0.35 | 0.57 | 2.3 | 0.81 |
|  | 70° C. | 0.76 | 1.0 | 0.81 | 1.0 | 0.80 | 0.49 | 0.30 | 0.38 | 1.4 | 0.46 |
| Removal workability | | G | G | G | G | G | G | A | A | P | A |
| Removability at 70° C. | | G | G | G | G | G | G | P | P | G | P |

As shown in Table 1, the films formed from the coating compositions of Examples A1 to A6 were all removed from the paint layers with good workability and were removable from the paint layers even at 70° C. On the other hand, with respect to the films formed from the coating compositions of Examples A7 to A9 with the base polymer-forming monomers having a molar ratio ($m_T/m_L$) below 0.8 or above 1.5 and the film formed from the coating composition of Example A10 with acrylonitrile-free monomers, removal workability was not combined with removability at 70° C.

Experiment 2

<Preparation of Coating Compositions>

Example B1

To the acrylic coating composition of Example A1 prepared in Experiment 1, for 100 parts of acrylic polymer in the composition, were added 5 parts of titanium dioxide (product name TIPAQUE CR-95, rutile titanium dioxide available from Ishihara Sangyo Kaisha, Ltd.; mean particle diameter 280 nm), 45 parts of calcium carbonate (product name SOFTON 3200 available from Shiraishi Calcium Kaisha, Ltd.), 1 part of dispersing agent (product name DISPERBYK-2015 available from BYK), 1 part of a defoaming agent (product name DISPARLON AQ7533 available from Kusumoto Chemicals, Ltd.) and 1.5 part of thixotropic agent (product name OPTIGEL WX available from BYK), and was further added water to adjust the NV to 50%. Accordingly, was obtained the acrylic coating composition according to this Example.

Examples B2 and B12

The amounts of calcium carbonate, dispersing agent and thixotropic agent were changed as shown in Table 2. Otherwise in the same manner as Example B1, were obtained acrylic coating compositions according to the respective Examples.

Examples B3 to B7

Were further added the thickener species in the amounts shown in Table 2. Otherwise in the same manner as Example B2, were obtained acrylic coating compositions according to the respective Examples.

Examples B8 to B11

Were further added the thickener species in the amounts shown in Table 2 and no thixotropic agent was used. Otherwise in the same manner as Example B2, were obtained acrylic coating compositions according to the respective Examples.

Examples B13 and B14

Were further added the thickener species in the amounts shown in Table 2 and no thixotropic agent was used. Otherwise in the same manner as Example B1, were obtained acrylic coating compositions according to the respective Examples.

The thickeners shown in abbreviations in Table 2 are as follows:
- H-3300VF: product name RHEOBYK-H 3300W available from BYK
- T1010: product name RHEOBYK-T 1010 available from BYK
- L1400: product name RHEOBYK-L 1400 available from BYK
- SANHEC-L: product name SANHEC L available from Sansho Co., Ltd.
- WSR N-80: product name POLYOX WSR N-80 available from Dow Chemical Company
- UH-450VF: product name ADEKA NOL UH-450VF available from ADEKA
- UH-420: product name ADEKA NOL UH-420 available from ADEKA <Measurements and Evaluations>

The coating compositions according to Examples B1 to B14 and the coating composition of Example A1 were subjected to the following measurements and evaluations. The results are shown in Table 2.

[Determination of Viscosity with BH Viscometer]

At 30° C., using a BH viscometer with a No. 6 rotor, the viscosity was measured at 2 rpm and at 20 rpm. From the results, the Ti value (ratio of viscosity at 20 rpm to viscosity at 2 rpm) was determined.

[Determination of Viscosity with Cone Plate Rheometer]

Using a rheometer (RheoStress 1 available from Haake Technik GmbH) with a cone-type rotor (cone diameter: 35 mm; cone angle: 0.5°), at 30° C., from the viscosity measured while continuously changing the shear rate from 0.1 sec$^{-1}$ to 2000 sec$^{-1}$, the viscosity at 1 sec$^{-1}$, 10 sec$^{-1}$, 100 sec$^{-1}$ and 1000 sec$^{-1}$ were determined.

It is noted that with respect to the coating compositions of Examples B1, B6 and B13, films were formed from these compositions in the same manner as Experiment 1 and their storage moduli G'(23) were determined to be all in the range of 150 MPa or higher and 1000 MPa or lower as follows: 290 MPa (Ex. B1), 320 MPa (Ex. B6) and 310 MPa (Ex. B13). These films all had storage moduli G'(70)≥0.40 MPa as follows: 1.6 MPa (Ex. B1), 1.4 MPa (Ex. B6) and 1.5 MPa (Ex. B13).

[Anti-Sag Properties]

Was horizontally held a painted steel plate with the painted face up, the steel plate coated with an acid epoxy crosslinked acrylic paint (product name KINO1210TW available from Kansai Paint Co., Ltd.). In an environment at 23° C., onto the painted face of the painted steel plate, using an applicator available from TP Giken Co., Ltd., was applied the coating composition according to each Example in a 100 mm wide border to a thickness of 200 μm by non-volatiles (i.e., 400 μm in wet film thickness). Immediately after the application, the painted steel plate was allowed to stand vertically and left for one minute. Subsequently, the state of the applied material (the composition applied onto the painted steel plate) was visually inspected. According to the results, anti-sag properties were evaluated based on the three grades shown below. The higher the score is, the better the anti-sag properties are.

3 points: no sagging or running 2 points: sagging observed, but no running 1 point running observed

[Die-Coating Properties]

A coating head (SCDM-3/140 available from Nordson Corporation; 120 mm wide) was adjusted to a shim thickness of 300 μm. Into the coating head, was fed the coating composition according to each Example at an extrusion rate of 3000 cm$^3$/min. While doing this, the width of liquid film extruded from the 120 mm×300 μm slit was measured at a location 20 mm down the slit exit (downward). According to the value, die-coating properties were evaluated on the three grades shown below. It can be said that the higher the score is, the better the die-coating properties are. It is noted that when the liquid film continuity was broken in the width direction (e.g., when the liquid film was forked in two or more parts, etc.), it received a 1-point grade regardless of the overall width.

3 points: liquid film width at 20 mm down the exit≥100 mm 2 points: liquid film width≥80 mm, <100 mm 1 point: liquid film width<80 mm

[Defoaming Properties]

In an environment at 23° C., into a 200 mL volume beaker, 100 mL of each coating composition was placed, stirred at 1000 rpm for 5 minutes using a disper, and then left standing. At 5 minutes of standing, was measured the liquid level $H_1$ (distance from the bottom of the beaker to the liquid surface; the same applies hereinafter). Relative to the initial (pre-stirring) liquid level $H_0$, defoaming properties were evaluated according to the three grades shown below. The results are shown in Table 2. The higher the score is, the better the defoaming properties are.

3 points: no difference between $H_1$ and $H_0$ (no liquid level rise)

2 points: $H_1 > H_0$, difference≤10% (up to 10% liquid level rise)

1 point: $H_1 > H_0$ by more than 10% (>10% liquid level rise)

TABLE 2

| Composition (parts by weight) | | B1 | B2 | B3 | B4 | B5 | B6 | B7 | B8 | B9 | B10 | B11 | B12 | B13 | B14 | A1 |
|---|---|---|---|---|---|---|---|---|---|---|---|---|---|---|---|---|
| Acrylic polymer | | 100 | 100 | 100 | 100 | 100 | 100 | 100 | 100 | 100 | 100 | 100 | 100 | 100 | 100 | 100 |
| Titanium dioxide | | 5 | 5 | 5 | 5 | 5 | 5 | 5 | 5 | 5 | 5 | 5 | 5 | 5 | 5 | — |
| Calcium carbonate | | 45 | 20 | 20 | 20 | 20 | 20 | 20 | 20 | 20 | 20 | 20 | 20 | 45 | 45 | — |
| Dispersing agent | | 1 | 0.5 | 0.5 | 0.5 | 0.5 | 0.5 | 0.5 | 0.5 | 0.5 | 0.5 | 0.5 | 0.5 | 1 | 1 | — |
| Defoaming agent | | 1 | 1 | 1 | 1 | 1 | 1 | 1 | 1 | 1 | 1 | 1 | 1 | 1 | 1 | — |
| Thixotropic agent | | 1.5 | 1.25 | 1.25 | 1.25 | 1.25 | 1.25 | 1.25 | — | — | — | — | 0.5 | — | — | — |
| Thickener | | | | | | | | | | | | | | | | |
| H-3300VF | | — | — | 0.5 | — | — | — | — | — | — | — | — | — | 2 | 0.8 | — |
| T1010 | | — | — | — | 0.5 | — | — | — | 1 | — | — | — | — | — | — | — |
| L1400 | | — | — | — | — | 0.5 | — | — | — | 1 | — | — | — | — | — | — |
| SANHEC-L | | — | — | — | — | — | 3 | — | — | — | — | — | — | — | — | — |
| WSRN-80 | | — | — | — | — | — | — | 3 | — | — | — | — | — | — | — | — |
| UH-450VF | | — | — | — | — | — | — | — | — | — | 1 | — | — | — | — | — |
| UH-420 | | — | — | — | — | — | — | — | — | — | — | 1 | — | — | — | — |
| BH viscosity (Pa·s) | 2 rpm | 62 | 80 | 90 | 60 | 70 | 80 | 85 | 50 | 97.5 | 130 | 115 | 20 | 330 | 210 | 11 |
| | 20 rpm | 7.3 | 11.5 | 16.5 | 9 | 10.5 | 11.5 | 12 | 34 | 22.5 | 34 | 30.5 | 3.5 | 83 | 56 | 2.2 |
| | Ti value | 8.5 | 7.0 | 5.5 | 6.7 | 6.7 | 7.0 | 7.1 | 1.5 | 4.3 | 3.8 | 3.8 | 5.7 | 4.0 | 3.8 | 5.0 |
| Rheometer viscosity (Pa·s) | 1 sec$^{-1}$ | 62.9 | 36.1 | 55.0 | 54.0 | 35.0 | 30.0 | 32.0 | 27.2 | 43.7 | 107.1 | 73.3 | 17.0 | 123.2 | 106.9 | 8.9 |
| | 10 sec$^{-1}$ | 12.8 | 9.3 | 9.9 | 6.4 | 6.4 | 5.6 | 6.1 | 6.6 | 11.3 | 27.9 | 31.1 | 2.8 | 40.4 | 33.6 | 1.6 |
| | 100 sec$^{-1}$ | 2.2 | 1.6 | 2.3 | 1.3 | 1.4 | 1.3 | 1.3 | 2.1 | 3.3 | 5.7 | 8.2 | 0.6 | 12.7 | 11.2 | 0.4 |
| | 1000 sec$^{-1}$ | 0.4 | 0.4 | 0.7 | 0.5 | 0.5 | 0.4 | 0.5 | 0.7 | 0.9 | 0.7 | 1.4 | 0.2 | 2.2 | 1.3 | 0.1 |
| Anti-sag properties (score) | | 3 | 3 | 3 | 3 | 3 | 3 | 3 | 2 | 3 | 3 | 3 | 2 | 3 | 3 | 1 |
| Die-coating properties (score) | | 2 | 2 | 3 | 2 | 2 | 2 | 2 | 3 | 3 | 3 | 3 | 1 | 3 | 3 | 1 |
| Defoaming properties (score) | | 2 | 2 | 2 | 2 | 2 | 2 | 2 | 3 | 2 | 2 | 2 | 3 | 1 | 1 | 3 |

The coating compositions of Examples B1 to B11 all received 2-point or higher grades in evaluations of die-coating properties and defoaming properties. These coating compositions showed practical defoaming properties and are suitable for die-coating formation of paint-protective coating materials on paint layers.

Although specific embodiments of the present invention have been described in detail above, these are merely for illustrations and do not limit the scope of the claims. The art according to the claims includes various modifications and changes made to the specific embodiments illustrated above.

INDUSTRIAL APPLICABILITY

The paint-protective coating material provided by the art according to this Description is suitable as a paint-protective coating material used in an embodiment where it is provided onto a paint layer of an object to be protected to serve a role to protect the paint layer from damage such as scratches and dirt and from degradation, and removed from the protected object after such a protective role is completed. Examples of possible objects to be protected include painted metal plates (steel plates, stainless steel plates, aluminum plates, etc.) having paint layers on the surface (e.g. painted steel plates used for house building materials, other building materials, transportation equipment such as watercrafts, railroad vehicles and automobiles, etc.), painted synthetic resin plates and articles molded from these. The paint-protective coating material can be preferably used for applications where it is provided onto paint layers of objects to be protected (articles having paint layers formed by paint works, e.g. metal plates such as steel plates and molded articles thereof) and protects the paint layers, with the objects having been provided with paint works using paints of various compositions such as acrylic paints, polyester-based paints, alkyd-based paints, melamine-based paints, urethane-based paints, acid-epoxy crosslinked paints, and their composites (e.g. acrylic melamine-based paints, alkyd melamine-based paints, etc.).

REFERENCE SIGNS LIST 10 paint-protective coating material
20 object to be protected
22 paint layer

What is claimed is:

1. A paint-protective coating material formed from an acrylic coating composition comprising an acrylic polymer as base polymer, wherein the acrylic polymer is formed from monomers comprising a monomer ($m_T$) having a homopolymer glass transition temperature of 90° C. or higher and a monomer ($m_L$) having a homopolymer glass transition temperature of −30° C. or lower, with the monomer ($m_T$) comprising an acrylonitrile, in the monomers, the monomer ($m_T$) and the monomer ($m_L$) have a molar ratio ($m_T/m_L$) of 0.8 or higher and 1.5 or lower, a content of the acrylonitrile in the monomers is greater than 50 mol %, the base polymer accounts for 95% by weight or more of polymers in the acrylic coating composition, and the paint-protective coating material has a storage modulus at 23° C. of 150 MPa or higher and 1000 MPa or lower and a storage modulus at 70° C. of 0.40 MPa or higher.

2. An acrylic coating composition for forming a paint-protective coating material, wherein the acrylic coating composition comprises an acrylic polymer as base polymer, the acrylic polymer is formed from monomers comprising a monomer ($m_T$) having a homopolymer glass transition temperature of 90° C. or higher and a monomer ($m_L$) having a homopolymer glass transition temperature of −30° C. or lower, with the monomer ($m_T$) comprising an acrylonitrile, in the monomers, the monomer ($m_T$) and the monomer ($m_L$) have a molar ratio ($m_T/m_L$) of 0.8 or higher and 1.5 or lower, a content of the acrylonitrile in the monomers is greater than 50 mol %, the base polymer accounts for 95% by weight or more of polymers in the acrylic coating composition, and the acrylic coating composition forms a paint-protective coating material having a storage modulus at 23° C. of 150 MPa or higher and 1000 MPa or lower and a storage modulus at 70° C. of 0.40 MPa or higher.

3. The acrylic coating composition according to claim 2, wherein the acrylic polymer has a glass transition temperature of −30° C. or higher and −5° C. or lower, calculated based on the monomer composition.

4. The acrylic coating composition according to claim 2, wherein the acrylic coating composition further comprising 1 part to 60 parts by weight of an inorganic powder to 100 parts by weight of the acrylic polymer.

5. The acrylic coating composition according to claim 4, wherein the inorganic powder comprises titanium dioxide.

6. The acrylic coating composition according to claim 2, wherein the acrylic coating composition is a composition in aqueous emulsion form in which the acrylic polymer is dispersed in an aqueous solvent.

7. The acrylic coating composition according to claim 2, wherein the acrylic coating composition also has a viscosity $V_1$ of 20 Pa·s or higher and 200 Pa·s or lower, determined at 2 rpm using a BH viscometer and a viscosity $V_2$ of 1.0 Pa·s or higher at a shear rate of 100 sec$^{-1}$, determined using a cone plate rheometer.

8. A paint protection method, the method comprising
preparing the acrylic coating composition according to claim 2,
applying the acrylic coating composition to a paint layer of an object to be protected, and
drying the acrylic coating composition to form a paint-protective coating material.

9. The paint protection method according to claim 8, wherein the acrylic coating composition is applied with a slot die.

* * * * *